US008948785B1

(12) United States Patent
Grindeland

(10) Patent No.: US 8,948,785 B1
(45) Date of Patent: Feb. 3, 2015

(54) METHOD AND SYSTEM FOR MANAGING MOBILE STATION LOCATION INFORMATION

(75) Inventor: Jesse H. Grindeland, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 3258 days.

(21) Appl. No.: 10/264,100

(22) Filed: Oct. 3, 2002

(51) Int. Cl.
*H04W 4/02* (2009.01)

(52) U.S. Cl.
USPC .................................. 455/456.2; 455/414.1

(58) Field of Classification Search
USPC ........ 455/457, 466, 422.1, 418, 456.1–456.6, 455/414.1–414.4, 435.1, 433
See application file for complete search history.

(56) References Cited

U.S. PATENT DOCUMENTS

| 5,625,668 | A |   | 4/1997  | Loomis et al. |
| 5,835,907 | A |   | 11/1998 | Newman |
| 5,905,957 | A |   | 5/1999  | Olds |
| 6,088,598 | A |   | 7/2000  | Marsolais |
| 6,163,701 | A |   | 12/2000 | Saleh et al. |
| 6,185,427 | B1 |  | 2/2001  | Krasner et al. |
| 6,272,342 | B1 | * | 8/2001  | Havinis et al. ................ 455/433 |
| 6,311,069 | B1 | * | 10/2001 | Havinis et al. ............. 455/456.4 |
| 6,321,092 | B1 |  | 11/2001 | Fitch et al. |
| 6,421,002 | B2 |  | 7/2002  | Krasner |
| 6,424,840 | B1 |  | 7/2002  | Fitch et al. |
| 6,442,391 | B1 | * | 8/2002  | Johansson et al. ......... 455/456.2 |
| 6,609,064 | B1 | * | 8/2003  | Dean ............................. 701/213 |
| 6,636,801 | B2 | * | 10/2003 | Curbow ........................ 701/207 |
| 6,757,545 | B2 | * | 6/2004  | Nowak et al. .............. 455/456.2 |
| 6,778,818 | B1 | * | 8/2004  | O'Neil ........................ 455/404.1 |
| 7,035,647 | B2 | * | 4/2006  | de Verteuil ................. 455/456.1 |
| 7,096,030 | B2 | * | 8/2006  | Huomo ........................ 455/456.3 |
| 7,103,368 | B2 | * | 9/2006  | Teshima ...................... 455/456.3 |
| 2002/0016173 | A1 | * | 2/2002  | Hunzinger .................... 455/456 |
| 2002/0035605 | A1 | * | 3/2002  | McDowell et al. ........... 709/206 |
| 2002/0077897 | A1 | * | 6/2002  | Zellner et al. .................. 705/14 |
| 2002/0080063 | A1 | * | 6/2002  | Bloebaum et al. .......... 342/357.1 |
| 2002/0164996 | A1 | * | 11/2002 | Dorenbosch ................... 455/456 |
| 2002/0168988 | A1 | * | 11/2002 | Younis .......................... 455/456 |
| 2002/0184418 | A1 | * | 12/2002 | Blight ........................... 710/100 |
| 2002/0193121 | A1 | * | 12/2002 | Nowak et al. ................. 455/456 |
| 2003/0060214 | A1 | * | 3/2003  | Hendrey et al. ............... 455/456 |

(Continued)

FOREIGN PATENT DOCUMENTS

| WO | WO 01/33825 | A1 | 5/2001 |
| WO | WO 02/076118 | * | 9/2002 ............... H04Q 7/20 |

OTHER PUBLICATIONS

Mark Moeglein and Norman Krasner, "An Introduction to SnapTrack™ Server-Aided GPS Technology", pp. 1-11 (1998).
Qualcomm Incorporated CDMA Technologies, "Position Location Solutions for cdmaOne™ and 1x", pp. 1-4 (2001).
Open Mobile Alliance, "Open Mobile Alliance Short Paper", pp. 1-5. (Aug. 2002).

(Continued)

*Primary Examiner* — Khawar Iqbal

(57) ABSTRACT

Mobile stations initiate location determination sessions, such as at predetermined time intervals, with a wireless telecommunications network. The wireless telecommunications network obtains the locations of the mobile stations as a result of the location determination sessions, and the mobile station locations are stored in one or more location registers. The location information stored in the location register(s) may then be used by location-based applications. For example, an application may request that the wireless telecommunications network provide a specified service to the mobile stations that are located in a specified zone according to the mobile station locations stored in the location register(s).

15 Claims, 3 Drawing Sheets

(56) References Cited

U.S. PATENT DOCUMENTS

| | | | |
|---|---|---|---|
| 2003/0134646 A1* | 7/2003 | Forrester | 455/456 |
| 2003/0144008 A1* | 7/2003 | Rehkopf | 455/456 |
| 2003/0148771 A1* | 8/2003 | de Verteuil | 455/456 |
| 2003/0157942 A1* | 8/2003 | Osmo | 455/456 |
| 2004/0002343 A1* | 1/2004 | Brauel et al. | 455/456.1 |
| 2004/0077311 A1* | 4/2004 | Riley | 455/12.1 |
| 2004/0185871 A1* | 9/2004 | Somani et al. | 455/456.1 |
| 2004/0203854 A1* | 10/2004 | Nowak | 455/456.1 |
| 2004/0203922 A1* | 10/2004 | Hines et al. | 455/456.1 |
| 2004/0209602 A1* | 10/2004 | Joyce et al. | 455/414.1 |
| 2005/0239476 A1* | 10/2005 | Betrabet et al. | 455/456.1 |
| 2006/0019674 A1* | 1/2006 | McNew et al. | 455/456.1 |

OTHER PUBLICATIONS

Open GIS Consortium, "OGC's Open LS Initiative: Building a Foundation for Location Services" pp. 1-2 (2002).

Signal Soft Corporation, "Location Studio 2.0 Overview", pp. 1-18 (Jun. 2002).

Location Inter-Operability Forum, "Mobile Location Protocol", LIF TS 101 Specification, Version 3.0.0, pp. 1-92 (Jun. 6, 2002).

Telecommunications Industry Association, "Position Determination Service Standard for Dual-Mode Spread Spectrum Systems," TIA/EIA/IS-801, (Oct. 15, 1999).

Telecommunication Industry Association, "Enhanced Wireless 9-1-1 Phase 2", J-STD-036 (Jul. 12, 2000).

* cited by examiner

METHOD AND SYSTEM FOR MANAGING MOBILE STATION LOCATION INFORMATION

BACKGROUND

1. Field of the Invention

The present invention relates to telecommunications and, more particularly, to methods and systems for managing mobile station location information.

2. Description of Related Art

Wireless telecommunications networks are increasingly using wireless location technologies to determine the locations of the mobile stations they serve. As a result, there is an increasing interest in developing location-based applications, i.e., applications that make use of mobile station location information. These location-based applications may simply track or monitor the locations of mobile stations, or they may provide information or services to mobile stations based on their locations. Such location-based applications may be internal to the wireless telecommunications network, or they may be third-party applications that obtain the locations of mobile stations from a location server or other entity in the wireless telecommunications network. For example, the Location Inter-operability Forum (LIF) has developed the "Mobile Location Protocol Specification" (version 3.0.0 published on Jun. 6, 2002) to define an access method that allows applications to query a wireless network for location information.

One difficulty with expanding the use of location-based applications is that the process of obtaining mobile station locations for the applications may consume substantial network resources. In particular, wireless telecommunications networks typically initiate location determinations in order to respond to requests for location information from location-based applications. Thus, as the number of location-based applications requesting location information increases, and the number of mobile stations being located increases, the load on the wireless telecommunications network may correspondingly increase substantially.

Accordingly, there is a need to obtain and provide mobile station location information more efficiently.

SUMMARY

In a first principal aspect, an exemplary embodiment of the present invention provides a method of managing location information relating to a mobile station. The mobile station is able to send receive communications via a wireless telecommunications network. In accordance with the method, the mobile station initiates a location determination session with the wireless telecommunications network. The wireless telecommunications network obtains a location of the mobile station as a result of the location determination session, and the location is stored in a location register of the wireless telecommunications network.

In a second principal aspect, an exemplary embodiment of the present invention provides a method of managing location information relating to a plurality of mobile stations. The mobile stations initiate location determination sessions at predetermined time intervals. The locations of the mobile stations are obtained as a result of the location determination sessions, and the locations are stored in at least one location register.

In a third principal aspect, an exemplary embodiment of the present invention provides a system for managing mobile stations location information. The system comprises a location gateway, a position determining entity (PDE) communicatively coupled to the location gateway, and at least one location register. The location gateway receives requests from mobile stations to initiate location determination sessions. In response, the location gateway determines whether permissions to locate the mobile stations have been obtained. The PDE obtains the locations of the mobile stations during the location determination sessions, and the at least one location register stores the locations.

In a fourth principal aspect, an exemplary embodiment of the present invention provides a method of providing location-based services in a wireless telecommunications network serving a plurality of mobile stations that have mobile station locations stored in at least one location register. In accordance with the method, a request that a specified service be provided to mobile stations located in a specified zone is received. Zone-located mobile stations are identified by determining which of the plurality of mobile stations are located in the specified zone, according to the mobile station locations stored in the at least one register. The specified service is provided to at least one of the zone-located mobile stations.

DETAILED DESCRIPTION OF EXEMPLARY EMBODIMENTS

The present invention, in its preferred embodiments, provides a wireless telecommunications network with location information in advance of specific requests from location-based applications. In particular, the mobile stations themselves initiate location determination sessions with the wireless telecommunications network, as a result of which the wireless telecommunications network obtains the locations of the mobile stations. Preferably, the mobile stations initiate the location determination sessions at predetermined time intervals, such as every 15 minutes. However, the mobile stations may also be able to initiate location determination sessions at other times, i.e., "spontaneously."

The locations obtained in this way are stored in one or more location registers in the wireless telecommunications network. Internal and third-party location-based applications may then use the location information stored in the location registers. In many cases, this stored location information is sufficient for the location-based applications, such as being recent enough, so that the network will not need to make additional location determinations to respond to requests from location-bases applications. In this way, network resources may be conserved.

1. Exemplary Architecture

Figure 1:
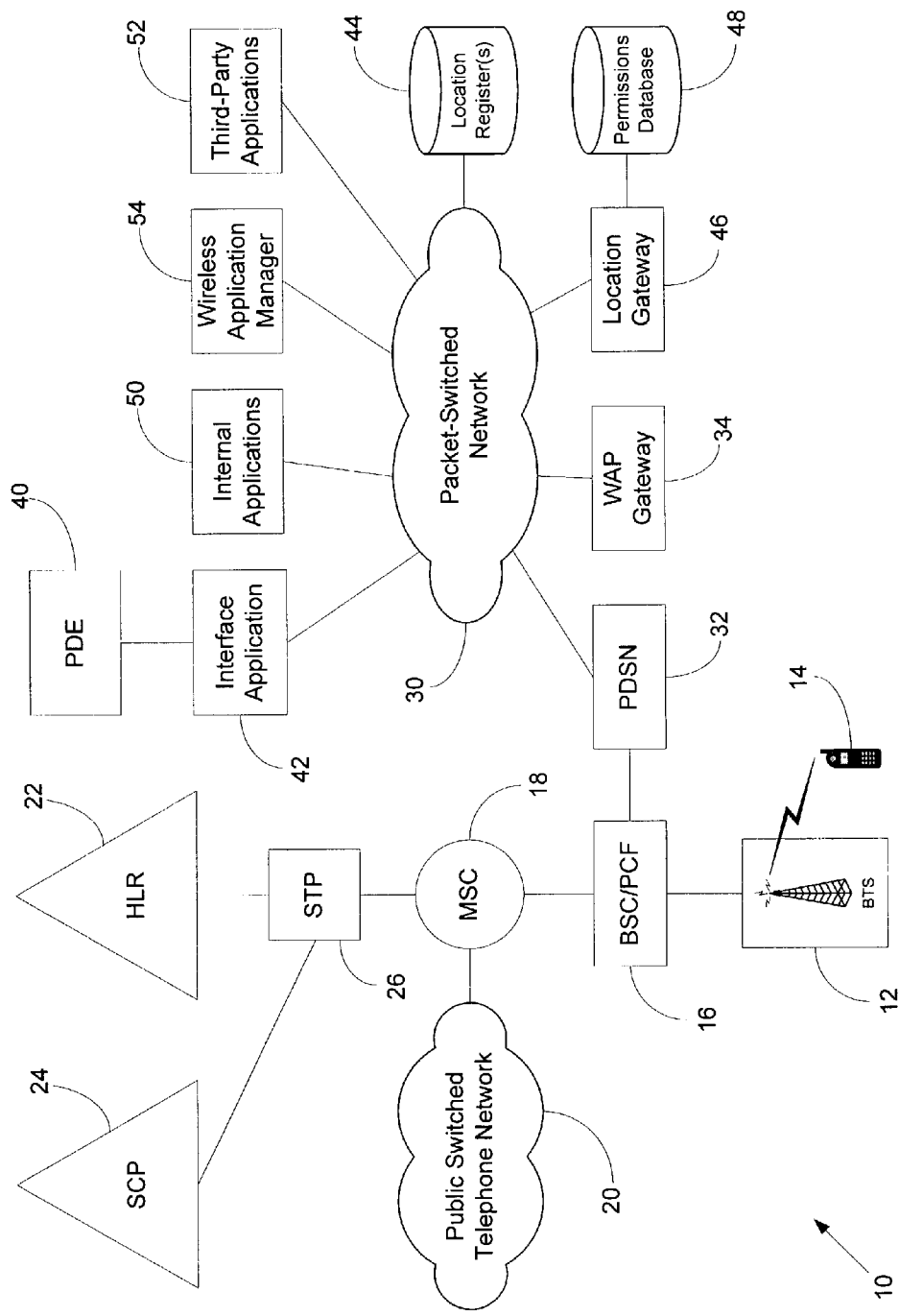
FIG. 1 is a simplified block diagram of a wireless telecommunications network, in accordance with an exemplary embodiment of the present invention.

Referring to the drawings, FIG. 1 is a simplified block diagram of an exemplary wireless telecommunications network 10 in which exemplary embodiments of the present invention may be employed. Wireless telecommunications network 10 includes a base transceiver station (BTS) 12 that provides a wireless coverage area within which BTS 12 may communicate with one or more mobile stations, such as mobile station 14, over an air interface. Mobile station 14 may be a wireless telephone, a wirelessly-equipped personal digital assistant (PDA), or other wireless communication device. The communications between BTS 12 and mobile station 14 may occur in a digital format, such as CDMA, TDMA, GSM, or 802.11x, or they may occur in an analog format, such as AMPS. A preferred wireless communications format is "CDMA 2000," such as described in EIA/TIA/IS-2000 Series, Rev. A (published March 2000), which is incorporated herein by reference.

BTS 12 is controlled by a base station controller (BSC) 16, which, in turn, is controlled by a mobile switching center (MSC) 18. MSC 18 is connected to the public switched telephone network (PSTN) 20 and may use an out-of-band signaling system, such as Signaling System 7 (SS7) to route calls through PSTN 20. MSC 18 is also able to signal to a home location register (HLR) 22 and to a service control point (SCP) 24. This signaling may occur via one or more signal transfer points (STPs), such as STP 26. The signaling between MSC 18 and HLR 22 may conform to IS-41 specifications. A recent revision of the IS-41 specifications, ANSI/TIA/EIA-41-D-97, published in December 1997, is incorporated herein by reference. The signaling between MSC 18 and SCP 24 may conform to the specification "Wireless Intelligent Network," TIA/EIA/IS-771, published in July 1999, which is incorporated herein by reference. Other signaling protocols could be used, however. In this way, MSC 18, BSC 16, and BTS 12 may connect incoming calls from PSTN 20, which calls may originate from calling parties using landline telephones, mobile stations, or other communication devices, to mobile station 14. Similarly, MSC 18, BSC 16, and BTS 12 may connect calls originating from mobile station 14 to their destinations, via PSTN 20.

Mobile station 14 is also able to access a packet-switched network 30. Packet-switched network 30 may include one or more local area networks (LANs) and/or one or more wide area network (WANs), such as the Internet. Packet-switched network 30 may route packets using a network protocol, such as the Transmission Control Protocol/Internet Protocol (TCP/IP).

To provide access to packet-switched network 30, BSC 16 may include a packet control function (PCF), and a packet data serving node (PDSN) 32 may connect BSC/PCF 16 to packet-switched network 30. The communications between BSC/PCF 16, MSC 18, and PDSN 32 may conform to "third generation" (3G) specifications. Examples of such 3G specifications include "Wireless IP Network Standard," 3GPP2 P.S0001-A, dated Jul. 16, 2001 and "3GPP2 Access Network Interfaces Interoperability Specification," 3GPP2 A.S0001-A, dated June 2001, which are incorporated herein by reference. Briefly stated, under these 3G specifications, when mobile station 14 requests packet data service, BSC/PCF 16 may engage in signaling with MSC 18 and with PDSN 32 to authenticate and authorize mobile station 14 and to set up a data link with PDSN 32. If this process is successful, a point-to-point protocol (PPP) session is established between mobile station 14 and PDSN 32. PDSN 32 then acts as a network access server, providing mobile station 14 access to packet-switched network 30. In some cases, mobile station 14 may use the Wireless Application Protocol (WAP) for communications via packet-switched network 30, in which case the communications may occur through a WAP gateway 34.

Packet-switched network 30 may also carry communications related to the process of obtaining and providing location information relating to mobile stations, such as mobile station 14. In this regard, wireless telecommunications network 10 may include a position determination entity (PDE) 40. As described in more detail below, PDE 40 may be able to communicate with mobile stations, such as mobile station 14, in location determination sessions carried over packet-switched network 30, during which PDE 40 may determine the locations of the mobile stations. In some embodiments, PDF 40 may not be able to communicate using the TCP/IP packet format used in packet-switched network 30. Accordingly, PDE 40 may be communicatively coupled to packet-switched network 30 via an interface application 42 that converts between the communication formats used by PDE 40 and packet-switched network 30.

As described in more detail below, the mobile station locations obtained in location determination sessions may be stored in one or more of location register(s) 44, which may be communicatively coupled to packet-switched network 30. In an exemplary embodiment, location register(s) 44 comprise a plurality of regional location registers. In particular, each regional location register may be associated with a geographic region, such as a region of the United States, and stores the locations of mobile stations that are located in its associated geographic region.

Wireless telecommunications network 10 may also include a location gateway 46, communicatively coupled to packet-switched network 30. Location gateway 46 may manage the processes of obtaining and utilizing mobile station location information in various ways. For example, location gateway 46 may be involved in setting up location determination sessions between mobile stations, such as mobile station 14, and PDE 40. For example, network 10 may be configured so that it does not locate a particular mobile station or provide location-based services to the mobile station unless the mobile station "opts in" by granting permission to be located and/or to receive specific location-based services. Accordingly, network 10 may include a permissions database 48 that stores information regarding the permissions that network 10 has obtained. Preferably, permissions database 48 is external to locations gateway 46, or wholly or partially internal to location gateway 46, so as to be accessible to location gateway 46. Before setting up a location determination session between a mobile station, such as mobile station 14, and PDE 40, location gateway 46 may query permissions database 48 in order to check whether network 10 has obtained permission to locate the mobile station.

Location gateway 46 may also serve as a gateway for applications seeking access to the location information contained in location register(s) 44. Such location-based applications may include internal applications 50 and/or third-party applications 52. Internal applications 50 may be treated by wireless telecommunications network 10 as "trusted" applications and may access location gateway 46, such as via packet-switched network 30, without network 10 applying security measures. In contrast, wireless telecommunications network 10 may require third-party applications 52 to access location gateway 46 via a wireless application manager 54, which, in turn, is communicatively coupled to location gateway 46 via packet-switched network 30. As described in more detail below, wireless application manager 54 may use a security service to authenticate and authorize third-party applications 52 before allowing them access to location gateway 46.

In addition to the foregoing, many other network elements may be communicatively coupled to packet-switched network 30 and may be able to communicate with mobile station 14 via packet-switched network 30.

2. Exemplary Operations

Exemplary operations are described below with reference to the exemplary architecture of FIG. 1, with mobile station 14 as a representative of a plurality of mobile stations served by wireless telecommunications network 10. One exemplary operation relates to the process of obtaining the location of mobile stations, such as mobile station 14, and storing the location in location register(s) 44. As described in more detail below, the location of mobile station 14 may be obtained as a result of a location determination session. Another exemplary operation relates to the utilization of the location information stored in location register(s) 44, such as by internal applications 50 and/or third-party applications 52.

a. Location Determination Sessions

In an exemplary embodiment, the process of obtaining the location of mobile station 14 begins when mobile station 14 initiates a location determination session with wireless telecommunications network 10. Mobile station 14 may initiate the location determination session autonomously. For example, mobile station 14 may be programmed to initiate a location determination session at predetermined time intervals, such as every 15 minutes.

Mobile station 14 may also initiate location determination sessions spontaneously. For example, an application running on mobile station 14 may cause it to initiate a location determination session at times other than the predetermined time intervals. Similarly, a network element in wireless telecommunications network 10, such as location gateway 46, may send a send a signal to mobile station 14 to cause it to initiate a location determination session at times other than the predetermined time intervals.

Wireless telecommunications network 10 obtains the location of mobile station 14 as a result of the location determination session initiated by mobile station 14. The specific manner in which the network 10 obtains the location will, in general, depend on the type of location-determining technique that is used and the specifics of the information that is exchanged during the location determination session. The communications between mobile station 14 and wireless telecommunications network 10 in the location determination session may conform to the specification "Position Determination Service Standard for Dual-Mode Spread Spectrum Systems," TIA/EIA/IS-801, dated Oct. 15, 1999, which is incorporated herein by reference. Other protocols may be used, however.

In a preferred embodiment, wireless assisted GPS is used to determine the location of mobile station 14. In the wireless assisted GPS approach, mobile station 14 includes a Global Positioning System (GPS) receiver but does not determine its location on its own. Instead, a location server in network 10, such as PDE 40, determines the location of mobile station 14, typically in terms of latitude and longitude, based at least in part on information provided by mobile station 14. For example, mobile station 14 may first send its approximation location, such as the cell or sector it is operating in, to PDE 40. Using this approximate location, PDE 40 determines what GPS satellites are in view and their Doppler offsets and then sends this information to mobile station 14 as "assistance data." Mobile station 14 then uses this assistance data to acquire GPS signals from the GPS satellites and, thereby, obtains information, such as pseudoranges, from which its location may be calculated. Mobile station 14 sends the pseudoranges and/or other location-related information to PDE 40. PDE 40 then calculates the location of mobile station 14, such as in terms of latitude and longitude, based on the information from mobile station 14 and, optionally, various corrections. In this way, wireless telecommunications network 10 obtains the location of mobile station 14 as a result of the location determination session.

However, other techniques for determining the location of mobile station 14 may be used. For example, mobile station 14 may use its GPS receiver to determine its location without network assistance. In that case, mobile station 14 may simply send to PDE 40 or other network element its calculated location, e.g., its latitude and longitude, during the location determination session. Alternatively, location technologies that do not rely on GPS may be used to determine the location of mobile station 14.

In a preferred approach, wireless assisted GPS is used, as described above. In addition, mobile station 14 preferably communicates with PDE 40 via packet-switched network 30, so as to avoid additional loading of the circuit-switched side of wireless telecommunications network 10. Thus, mobile station 14 may communicate with PDE 40 using IS-801 messages that are encapsulated in TCP/IP packets.

Mobile station 14 may initiate a location determination session by first initiating a TCP/IP session via PDSN 32. Mobile station 14 may then begin the location determination process by sending PDE 40 an IS-801 message encapsulated in TCP/IP packets. For example, mobile station 14 may include a Qualcomm gpsOne-enabled chipset that generates the IS-801 message. The encapsulated IS-801 message may traverse PDSN 32, WAP gateway 34, and packet-switched network 30 and may be reviewed by location gateway 46 before reaching the PDE 40.

Location gateway 46 unwraps the IS-801 message and queries permissions database 48 to determine whether the sender has given permission to be located in this manner. If the sender has not given permission, location gateway 46 may return an "ask" message to mobile station 14 that asks whether the user will give permission to being located. The user may respond to the "ask" message, and mobile station 14 may transmit the response to location gateway 46. In addition, subscribers may be able to use their mobile stations to turn their permissions on and off as desired at other times.

If the appropriate permission is indicated, either in permissions database 48 or in an affirmative response to the "ask" message, location gateway 46 encapsulates the IS-801 message into TCP/IP packets and sends it to PDE 40. If PDE 40 is unable to use the packet format used by packet-switched network 30, then interface application 42 may unwrap the IS-801 message from the TCP/IP packets and deliver the IS-801 message to PDE 40. Alternatively, location gateway 46 may be able to send the IS-801 message to PDE 40 directly.

After PDE 40 receives the initial IS-801 message, PDE 40 and mobile station 14 may continue to communicate as needed in order to complete the location determination. As noted above, the messaging required for PDE 40 to obtain the location of mobile station 14 will, in general, depend on the type of location technology that is used.

Once PDE 40 obtains the location of mobile station 14, the location, the mobile identification number (MIN) or other identifier of mobile station 14, and a timestamp are stored in location register(s) 44. In a preferred approach, PDE 40 sends the location to mobile station 14, and mobile station 14 sends its location, such as in an XML message, to the one of location register(s) 44 associated with its geographic region. Alternatively, PDE 40 may send the location to location register(s) 44 without going through mobile station 14.

Figure 2:
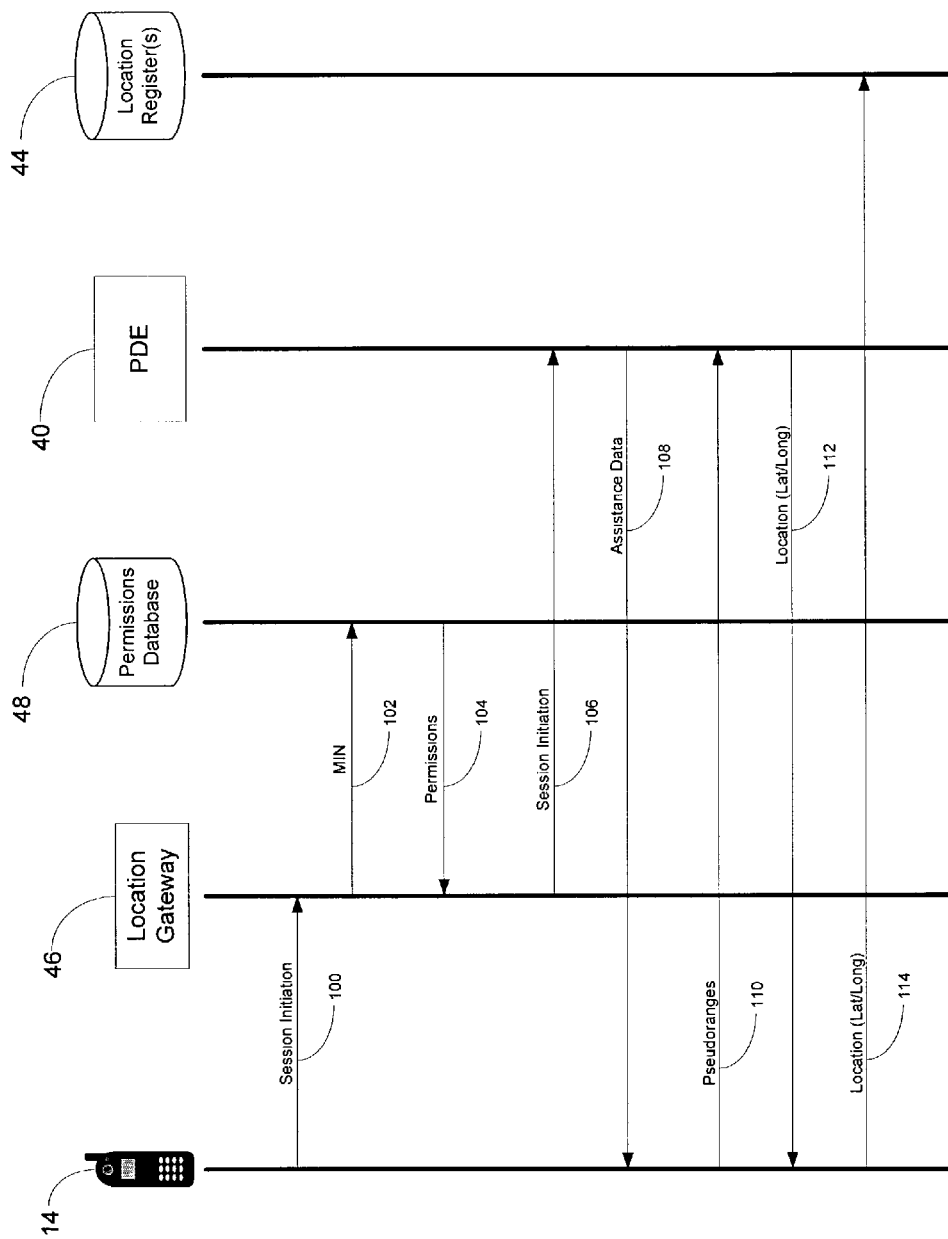
FIG. 2 is simplified call flow diagram, in accordance with an exemplary embodiment of the present invention.

FIG. 2 is a simplified call flow diagram for the exemplary process described above. As indicated by step 100, mobile station 14 initiates a location determination session by transmitting a session initiation message that is received by location gateway 46. As noted above, the session initiation message of step 100 is preferably carried over packet-switched network 30, such as in the form of an IS-801 message encapsulated in TCP/IP packets, and it may traverse various network elements, such as PDSN 32 and WAP gateway 34, before reaching location gateway 46.

In response to the message of step 100, location gateway 46 may check the permissions stored in permissions database 48 to determine whether a permission to locate mobile station 14 has been obtained. For example, location gateway 46 may send permissions database 48 a query that identifies mobile station 14, such as by MIN, as indicated by step 102. Permissions database 48 may return a response that includes the permissions, if any, associated with that MIN, as indicated by step 104. If the response of step 104 indicates an appropriate permission, then location gateway 46 forwards the session initiation message to PDE 40, as indicated by step 106. As noted above, the session initiation message of step 106 may reach PDE 40 via packet-switched network 30 and interface application 42.

PDE 40 and mobile station 14 may then continue to exchange messages so that PDE 40 obtains the location of mobile station 14. In the wireless assisted GPS approach, PDE 40 may send assistance data to mobile station 14, as indicated by step 108. Using this assistance data, mobile station 14 acquires location information from GPS satellites, such as pseudoranges, and sends the information to PDE 40, as indicated by step 110. PDE 40 then calculates the location of mobile station 14, such as in latitude and longitude, and sends the calculated location to mobile station 14, as indicated by step 112. Mobile station 14, in turn, sends location register(s) 44 a message that includes the calculated location of step 112, MIN or other identifier of mobile station 14, and a timestamp, as indicated by step 114. More particularly, mobile station 14 may send the message of step 114 to the one of location register(s) 44 associated with the geographic region in which mobile station is presently located, which location register then stores the relevant information contained in the message, e.g., the location, MIN, and timestamp.

b. Utilization of Location Information

One of the benefits of having the mobile stations initiate location determination sessions is that the mobile station locations are already stored in location register(s) 44 in advance of specific requests by location-based applications, such as internal applications 50 and third-party applications 52. Thus, when a location-based application needs mobile station locations, the application may, in many cases, use the information already stored in location register(s) 44, rather than requesting network 10 to use its resources to find mobile stations. More particularly, internal applications 50 may query location gateway 46, and third-party applications 52 may query location gateway 46 via wireless application manager 54, to make use of the location information stored in location register(s) 44. In this way, the location information stored in location register(s) 44 may be used to support broadcasting and multicasting technologies.

For example, the present invention may provide an application programming interface (API) that location-based applications can use to target multiple mobile stations located within a specified zone. Specifically, network 10 may support a Loc(Zone) API that location-based applications may use to request that a specified service be provided to multiple mobile stations located in a specified zone, based on the locations stored in location register(s) 44. The "zone" may be defined in a number of different ways, such as by zip code, postal code, city, or latitude and longitude ranges. In many cases, the specified service may involve delivery of a message to the mobile stations located in the zone. The message may, for example, include text or graphics that a mobile station may be able to display or to save for later use. As other examples, the message may instruct the mobile station to generate a sound, vibrate, provide some other user-discernable indication, or perform some other function. In other cases, the specified service may relate to the process of setting up broadcast or multicast calls or to some other type of service.

When an application uses the Loc(Zone) API, location gateway 46 queries location register(s) 44 for an identification of the mobile stations, such as by MIN, that are located in the specified zone. If multiple regional location registers are used, then location gateway 46 may direct its query to the one or more regional location registers associated with geographic regions overlapping the specified zone. Location register(s) 44 may send location gateway 46 a response that indicates the MINs of the mobile stations currently located in the specified zone, based on the mobile station locations stored therein.

Location gateway 46 receives the MINs from location register(s) 44 and determines which of the identified mobile stations have granted permission for the service specified by the location-based application. For example, location gateway 46 may provide the MINs to permissions database 48, which may respond with the permissions associated with the MINs. In this way, location gateway 46 may determine which mobile stations in the specified zone have authorized receipt of the specified service. Location gateway 46 may then provide the specified service to the authorized mobile stations. For example, location gateway 46 may deliver a message to the authorized mobile stations using SMS, WAP push, e-mail, instant messaging, or other delivery method.

After the mobile stations receive the message or other service, the mobile stations may send acknowledgements back to location gateway 46. Location gateway 46 may then notify the requesting application when service delivery is complete. Location gateway 46 may also provide the requesting application with other service-related information, such as the number of mobile stations who received the message or service.

Figure 3:
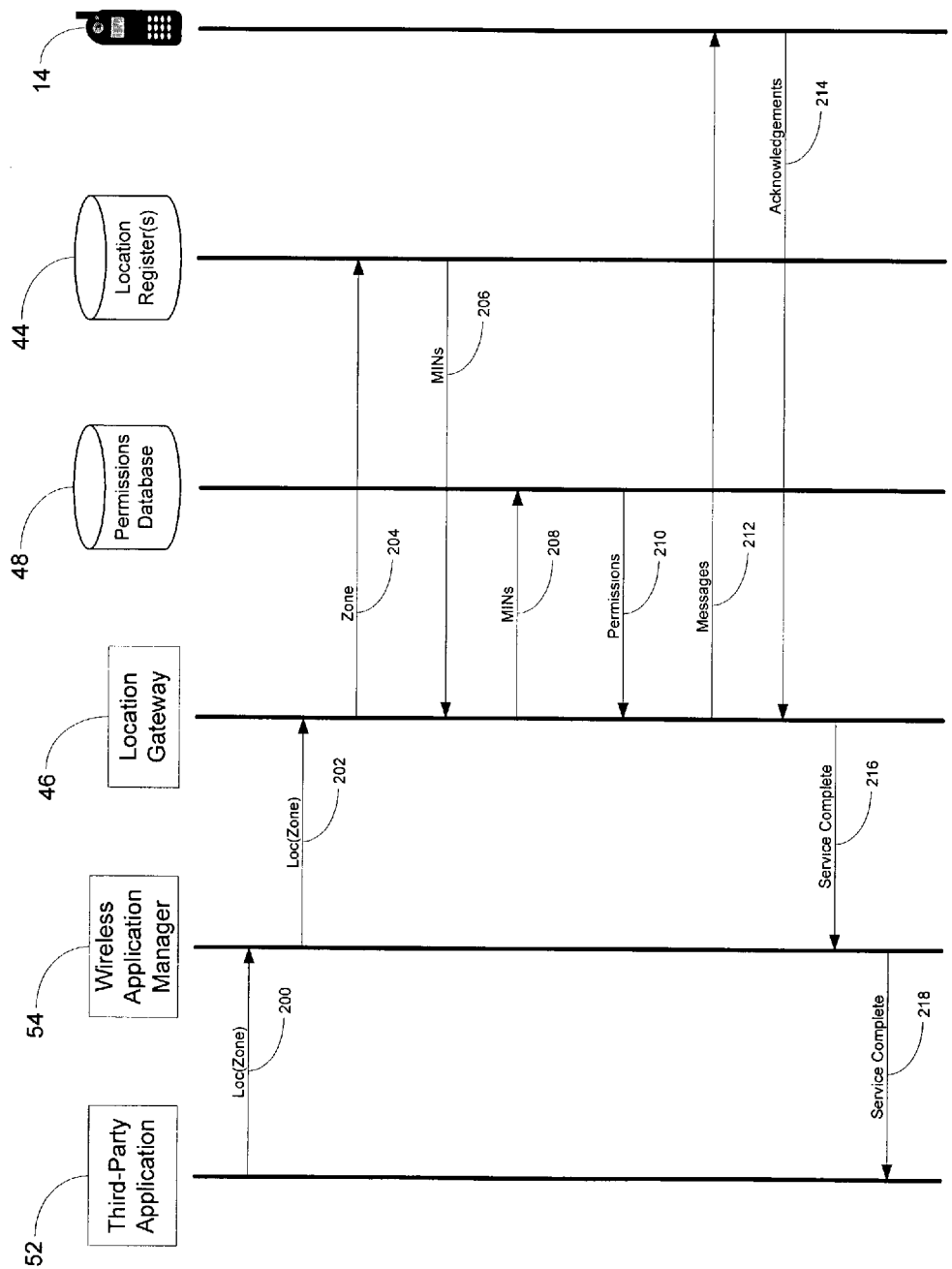
FIG. 3 is simplified call flow diagram, in accordance with an exemplary embodiment of the present invention.

FIG. 3 is a simplified call flow diagram for the exemplary process described above, for the case where the requesting application is one of third-party applications 52. As indicated by step 200, third-party application 52 sends a Loc(Zone) request to wireless application manager 54. The Loc(Zone) request of step 200 specifies a zone and a service to provided to mobile stations located in the specified zone. For example, the Loc(Zone) request may specify a message, such as an alert or a coupon, to be delivered to the mobile stations in the specified zone. In response to the Loc(Zone) request, wireless application manager 54 may authenticate and authorize third-party application 52 for the specified service. Wireless application manager 54 then forwards the Loc(Zone) request to location gateway 46, as indicated by step 202.

In response, location gateway 46 sends location register(s) 44 a query that includes the specified zone, as indicated by step 204. As indicated by step 206, location register(s) 44 responds with an identification, such as the MINs, of all of the mobile stations that are located in the specified zone, according to the mobile station locations stored in location register(s) 44. As indicated by step 208, location gateway 46 may then send permissions database 48 a query that includes the MINs or other mobile station identifications obtained in step 206. Permissions database 48 responds with the permissions associated with the MINs, as indicated by step 210.

From the permissions obtained in step 210, location gateway 46 determines which of the mobile stations identified in step 206 have authorized the specified service. Location gateway 46 may then provide the specified service to the authorized mobile stations. For example, location gateway 46 may send messages to the authorized mobile stations, such as mobile station 14, as indicated by step 212. The mobile stations, such as mobile station 14, may send back to location gateway 46 acknowledgements that they have received the messages, as indicated in step 214.

Location gateway 46 may then send a service complete message to wireless application manager 54, as indicated by step 216. The service complete message may include the number of messages sent to mobile stations located in the specified zone and/or other information relating to the specified service. However, depending on the location-based application, the service complete message may or may not identify specific mobile stations, such as by MIN, that received the message or other service. Wireless application manager 54 then forwards the service complete message to third-party application 52, as indicated by step 218.

Preferably, the Loc(Zone) API uses the mobile station locations determined in advance and stored in location register(s) 44, such as in the manner shown in FIG. 2 and described above. However, the Loc(Zone) API may also be used when the locations of multiple mobile stations in the specified zone are determined in other ways.

3. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method of managing location information relating to a mobile station, said mobile station configured to send and receive communications via a wireless telecommunications network, said method comprising:
   said wireless telecommunications network obtaining a location of said mobile station;
   storing said location in a location register of said wireless telecommunications network, wherein said location register stores said location associated with an identification of said mobile station and a timestamp;
   a location gateway receiving a request from a location-based application external to said mobile station, wherein said request specifies a zone;
   in response to said request, said location gateway sending a query to said location register, wherein said query asks for an identification of mobile stations that are located in said zone; and
   in response to said query, said location register identifying said mobile station to said location gateway when said location stored in said location register is in said zone.

2. The method of claim 1, wherein said request specifies a service to be provided to mobile stations located in said zone.

3. The method of claim 2, further comprising:
   said location gateway determining whether said mobile station has authorized said service.

4. The method of claim 1, further comprising:
   said mobile station initiating a location determination session with said wireless telecommunications network.

5. The method of claim 4, wherein said mobile station initiates said location determination session at predetermined time intervals.

6. The method of claim 4, wherein said mobile station initiating the location determination session with said wireless telecommunications network comprises:
   said mobile station transmitting a session initiation message.

7. The method of claim 6, further comprising:
   said location gateway receiving said session initiation message via a packet-switched network.

8. The method of claim 7, further comprising:
   said location gateway determining whether a permission to locate said mobile station has been obtained.

9. The method of claim 8, wherein said location gateway determining whether a permission to locate said mobile station has been obtained comprises:
   said location gateway querying a permissions database.

10. The method of claim 8, further comprising:
    when said permission to locate said mobile station has not been obtained, said location gateway sending a message to said mobile station asking for said permission.

11. The method of claim 8, further comprising:
    when said permission to locate said mobile station has been obtained, said location gateway forwarding said session initiation message to a position determination entity (PDE).

12. The method of claim 11, further comprising:
    said mobile station sending location information to said PDE during said location determination session; and
    said PDE determining said location of said mobile station based, at least in part, on said location information.

13. The method of claim 12, further comprising:
    said mobile station obtaining said location information, at least in part, from signals acquired from global positioning system (GPS) satellites.

14. The method of claim 12, further comprising:
    said mobile station receiving assistance data from said PDE;
    using said assistance data, said mobile station acquiring signals from global positioning system (GPS) satellites; and
    said mobile station obtaining said location information, at least in part, from said signals from said GPS satellites.

15. The method of claim 11, further comprising:
    said PDE determining said location of said mobile station during said location determination session;
    said PDE transmitting said location to said mobile station; and
    said mobile station transmitting said location to said location register.

* * * * *